United States Patent
Liang et al.

(10) Patent No.: US 9,888,179 B1
(45) Date of Patent: Feb. 6, 2018

(54) VIDEO STABILIZATION FOR MOBILE DEVICES

(71) Applicant: Google Inc., Mountain View, CA (US)

(72) Inventors: Chia-Kai Liang, Mountain View, CA (US); Xue Tu, Mountain View, CA (US); Lun-Cheng Chu, Mountain View, CA (US); Jianing Wei, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/269,447

(22) Filed: Sep. 19, 2016

(51) Int. Cl.
*H04N 5/228* (2006.01)
*H04N 5/232* (2006.01)

(52) U.S. Cl.
CPC ..... *H04N 5/23267* (2013.01); *H04N 5/23258* (2013.01); *H04N 5/23261* (2013.01); *H04N 5/2329* (2013.01)

(58) Field of Classification Search
None
See application file for complete search history.

(56) References Cited

U.S. PATENT DOCUMENTS 9,232,138 B1    1/2016   Baldwin

OTHER PUBLICATIONS

Alexandre Karpenko, David Jacobs, Jongmin Baek, Mark Levoy; Digital Video Stabilization and Rolling Shutter Correction using Gyroscopes; Stanford Tech Report CTSR Mar. 2011; pp. 1-7.

*Primary Examiner* — Stephen Coleman
(74) *Attorney, Agent, or Firm* — Troutman Sanders LLP; James E. Schutz; Andrew C. Doherty

(57) ABSTRACT

The disclosed technology includes techniques for providing improved video stabilization on a mobile device. Using gyroscope data of the mobile device, the physical camera orientation of the mobile device may be estimated over time. Using the physical camera orientation and historical data, corresponding virtual camera orientations representing a camera orientation with undesired rotational movement removed may be modeled using a non-linear filter to provide for mapping of a real image to a stabilized virtual image. The virtual camera orientation may be modified to prevent undefined pixels from appearing in the output image.

20 Claims, 14 Drawing Sheets
(8 of 14 Drawing Sheet(s) Filed in Color)

VIDEO STABILIZATION FOR MOBILE DEVICES

BACKGROUND

Handheld mobile devices, such as smartphones, commonly include video cameras that enable a user to record digital video. However, digital videos recorded on a handheld mobile device frequently include undesired motion resulting from the user's shaky or erratic hand movements during recording. Other distortions, such as wobble and skew, may occur due to a digital camera's use of a rolling shutter sensor. Further distortions may be caused by a phenomenon known as focus breathing, which involves a change in focal length that occurs when the focus distance of the lens is changed, causing the image boundary to unexpectedly shift.

Various video stabilization techniques attempt to correct for some of these problems, but known techniques suffer from various limitations. For example, image-based analysis that attempts to estimate the camera motion from the video input is not always reliable because noise, blur, and the presence of dominant objects in the video frame may cause unreliable estimates of camera motion. Some solutions operate on cinematographic cameras or may be performed in post-production operations, but such solutions are not viable for real-time operation on a mobile device due to the inherently limited computing resources of such devices. Many mobile device solutions are also unable to deliver consistent results in preview and video, leading the final video composition to look different from what a user may see while recording. For example, some mobile device video stabilization techniques use a Gaussian filter to model the motion of the camera, which does not produce high-quality results.

Therefore, it would be desirable to provide a video stabilization technique that can more accurately model the motion of the camera to remove undesired movements, rolling shutter distortion, undefined black boundaries, and focus breathing from a video to produce a high quality video on a mobile device such that both the preview view of the mobile device and the corresponding video stream are stabilized in real-time.

BRIEF DESCRIPTION OF THE FIGURES

The patent or application file contains at least one drawing executed in color. Copies of this patent or patent application publication with color drawing(s) will be provided by the Office upon request and payment of the necessary fee. Reference will now be made to the accompanying figures and flow diagrams, which are not necessarily drawn to scale, and wherein.

DETAILED DESCRIPTION

Figure 1:
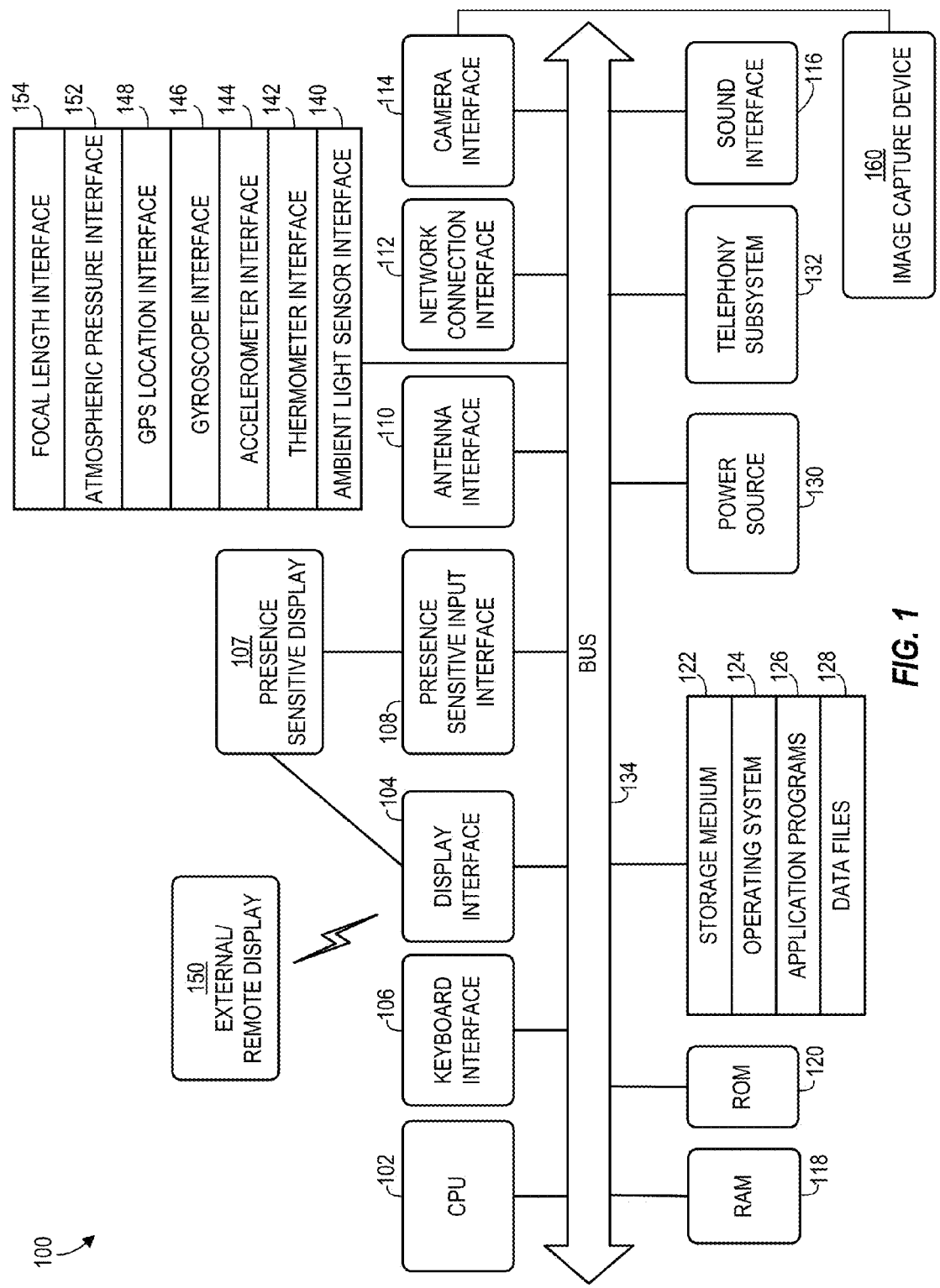
FIG. 1 depicts a block diagram of illustrative computing device architecture, according to an example implementation.

Implementations of the disclosed technology include systems and methods for providing improved video stabilization on a mobile device. According to some implementations, improved video stabilization may be achieved by correlating gyroscope data and focal length sensor data of an image capture device associated with the mobile device with the hand motion of the user and movement in the video to estimate the actual (i.e., real or physical) camera orientation as a video is recorded over time. Systems implemented according to the disclosed technology can continuously model a virtual (i.e., corrected or stabilized) camera orientation that represents the position of the camera absent undesired motions, such as jittery hand motions. Once the real camera orientation and virtual camera orientations have been determined, a grid or stabilization mesh can be used to transform the pixels of an input frame associated with the real camera orientation to an output frame associated with the virtual camera orientation, such that the video may be stabilized across a series of frames. Implementations of the disclosed technology may also be effective in removing the effects of focus breathing by accounting for changes in focal length of the camera.

According to some implementations, a goal of the improved video stabilization method is to maintain the same virtual camera orientation from frame to frame, except when the camera is determined to be panning or when the crop region is tending to go out of bounds. This approach may be referred to as a "constant pose" filter. Thus, according to some implementations, the systems and methods described herein seek to fix the virtual camera orientation at a constant position if the system determines no panning is occurring, or if the system determines that panning is occurring, the system estimates the panning and determines the virtual camera orientation based on the estimate of the panning.

In some implementations, the modeling of a virtual camera orientation may be achieved by comparing the physical camera orientation to historical data regarding previous camera orientations and making a determination regarding whether the camera is panning. The system may model the movement of the physical camera and may use a non-linear filter, such as a domain transform, to smooth out the projected motion path of the physical camera. A virtual camera orientation may then be determined based on the smoothed motion of the real camera, the previous virtual camera orientation, and a probability of panning that is determined by the system. The system and methods may use a multiple stage filtering that sequentially revises the estimate of the camera motion used in determining the virtual camera orientation.

The systems and methods described herein may also include functionality that prevents a black boundary from appearing in the output image due to undefined pixels being included in the transformation between the real image and the virtual image. This may be achieved by proposing an initial virtual camera orientation and then testing it against the transformation from real image to virtual image to determine if the resultant virtual image includes any undefined pixels. If it does, the method may include adjusting the proposed virtual camera orientation by blending it with the corresponding real camera orientation to make the new final virtual camera orientation more similar to the corresponding real camera orientation in order to eliminate the undefined pixels. Using the systems and methods described herein, a stabilized video with a smooth motion path free of the effects of jitter, black boundaries, and focus breathing can be generated in real time on a mobile device such that the preview view of the video matches the final video recording.

Throughout this disclosure, certain implementations are described by way of example in relation to determining real and virtual camera orientations associated with frames of a video. However, it should be understood that many mobile devices include digital cameras that use rolling shutters, which capture an image in successive scan lines. Accordingly, it should be understood that each frame of a video may have a plurality of scan lines, and each scan line may have an associated real and virtual camera orientation because each scan line may be obtained at slightly different points in time.

Some implementations of the disclosed technology will be described more fully hereinafter with reference to the accompanying drawings. This disclosed technology may, however, be embodied in many different forms and should not be construed as limited to the implementations set forth therein.

In the following description, numerous specific details are set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

A presence-sensitive input device as discussed herein, may be a device that accepts input by the proximity of a finger, a stylus, or an object near the device. A presence-sensitive input device may also be a radio receiver (for example, a Wi-Fi receiver) and processor which is able to infer proximity changes via measurements of signal strength, signal frequency shifts, signal to noise ratio, data error rates, and other changes in signal characteristics. A presence-sensitive input device may also detect changes in an electric, magnetic, or gravity field.

A presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display may have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as a PDA, satellite navigation devices, mobile phones, and video games. Further, such displays may include a capture device and a display.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums are disclosed for providing improved video stabilization, and will now be described with reference to the accompanying figures.

FIG. 1 depicts a block diagram of illustrative computing device architecture 100, according to an example implementation. Certain aspects of FIG. 1 may be embodied in a computing device, such as, a mobile computing device or smartphone. As desired, implementations of the disclosed technology may include a computing device with more or less of the components illustrated in FIG. 1. It will be understood that the computing device architecture 100 is provided for example purposes only and does not limit the scope of the various implementations of the present disclosed systems, methods, and computer-readable mediums.

The computing device architecture 100 of FIG. 1 includes a CPU 102, where computer instructions are processed; a display interface 104 that acts as a communication interface and provides functions for rendering video, graphics, images, and texts on the display. In certain implementations of the disclosed technology, the display interface 104 may be directly connected to a local display, such as a touch-screen display associated with a mobile computing device. In another example implementation, the display interface 104 may be configured for providing data, images, and other information for an external/remote display that is not necessarily physically connected to the mobile computing device. For example, a desktop monitor may be utilized for mirroring graphics and other information that is presented on a mobile computing device. In some implementations, the display interface 104 may wirelessly communicate, for example, via a Wi-Fi channel or other available network connection interface 112 to the external/remote display.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 106 that provides a communication interface to a keyboard. In one example implementation, the computing device architecture 100 may include a presence-sensitive display interface 107 for connecting to a presence-sensitive display. According to some implementations of the disclosed technology, the presence-sensitive display interface 107 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 107, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. In certain implementations, a camera interface 114 is provided that acts as a communication interface and provides functions for capturing digital images and video from an image capture device 160, such as a camera. In certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

Example implementations of the computing device architecture 100 may include various interfaces that provide communication interfaces to various sensors for data gathering. In certain implementations, an ambient light sensor interface 140 is provided as a communication interface and provides functions for obtaining light data from an ambient light sensor. In certain implementations, a thermometer interface 142 is provided as a communication interface and provides functions for capturing temperature data from a temperature sensor. In certain implementations, an accelerometer interface 144 is provided as a communication interface and provides functions for obtaining accelerometer data from an accelerometer. In certain implementations, a gyroscope interface 146 is provided as a communication interface and provides functions for obtaining gyroscope data from a gyroscope. In certain implementations, a GPS location interface 148 is provided as a communication interface and provides functions for obtaining location data from a GPS receiver. In certain implementations, an atmospheric pressure interface 152 is provided as a communication interface and provides functions for obtaining pressure data from a pressure sensor. In certain implementations, a focal length interface 154 is provided as a communication interface and provides functions for obtaining focal length data of a camera from a focal length sensor.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example implementation, the computing device architecture 100 includes a power source 130 that provides an appropriate alternating current (AC) or direct current (DC) to power components. According to an example implementation, the computing device architecture 100 includes a telephony subsystem 132 that allows the transmission and receipt of sound over a telephone network. The constituent devices and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device may be coupled, connected, and/or in communication with one or more peripheral devices, such as display. In another example implementation, the term computing device, as used herein, may refer to a mobile computing device, such as a smartphone or tablet computer. In this example implementation, the computing device may output content to its local display and/or speaker(s). In another example implementation, the computing device may output content to an external display device (e.g., over Wi-Fi) such as a TV or an external computing system.

In some implementations of the disclosed technology, the computing device may include any number of hardware and/or software applications that are executed to facilitate any of the operations. In some implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 2:
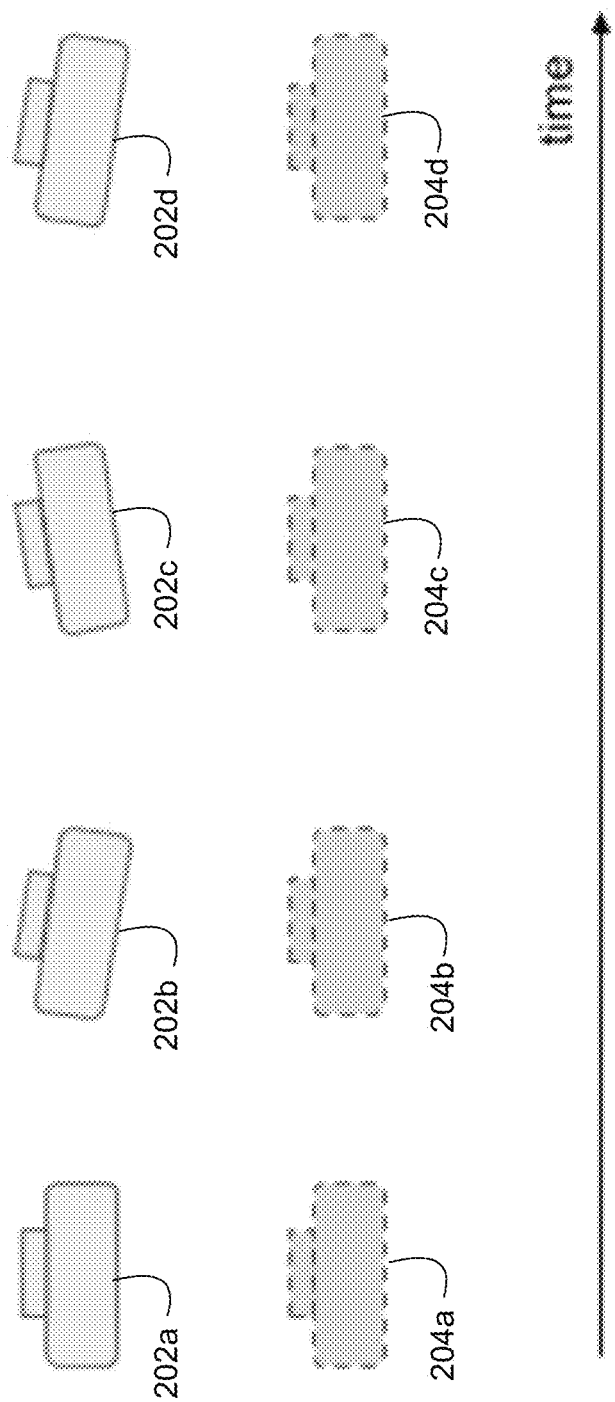
FIG. 2 is a top view of a series of real camera orientations and their associated virtual camera orientations, according to an example implementation.

As described herein, implementations of the disclosed technology include techniques for providing improved video stabilization on a mobile device that may include determining an estimate of the physical camera orientation (which may be interchangeably referred to as the real camera orientation or real pose) of the camera in relation to each frame of the video. The physical camera orientation may represent the camera's actual position at the time of filming a video frame. Implementations of the disclosed technology may further include modeling successive virtual camera orientations that correspond to each physical camera orientation. A virtual camera orientation may represent the camera's theoretical position when the undesired motion is removed by the system. This concept is illustrated in FIG. 2, which shows a top view of a first real camera orientation 202a, a second real camera orientation 202b, a third real camera orientation 202c, a fourth real camera orientation 202d and corresponding virtual camera orientations 204a-204d. A camera orientation may refer to the position of the camera, which may include the yaw, pitch, roll, and focal length of the camera. According to some implementations, a mobile device may include a gyroscope that can repeatedly provide sensor data indicative of the mobile device's yaw, pitch, and roll at successive points in time. According to some implementations, a mobile device may include a focal length sensor that may provide data indicative of the focal length of the camera.

According to some implementations, each real and virtual camera orientation may correspond to a unique time stamp of the video. In some embodiments, each real and virtual camera orientation may be associated with a particular video frame or scan line of a video frame. In some implementations, the system may use the first real camera orientation 202a as a starting point or initial reference point, and the system may designate that the first virtual camera orientation 204a has the same or substantially the same position as the first real camera orientation 202a. As shown in the example in FIG. 2, as the video progresses over time, the real camera orientation may rotate clockwise to arrive at the second real camera orientation 202b, then counterclockwise to arrive a the third real camera orientation 202c, and then clockwise to arrive at the fourth real camera orientation 202d. As shown in FIG. 2, according to some implementations of a method for providing improved video stabilization on a mobile device as described herein, the system may create virtual camera orientations 204a-d that corresponds to each real camera orientation 202a-d. Each virtual camera orientation 204a-d may represent the camera position of the corresponding real camera orientation 202a-d after the real camera orientation 202a-d has been adjusted to remove undesired rotational movement, providing for a stabilized path of the camera. As shown in FIG. 2, while the real camera orientations 202a-d wobble back and forth, the virtual camera orientations 202a-d provide a stabilized position devoid of unwanted rotation. According to some implementations, once a virtual camera orientation has been determined for a particular frame or scan line of the video, the image from the frame or scan line may be modified to show to reflect an estimate of what would have been filmed had the camera been positioned at the virtual camera orientation instead of the real camera orientation. In this way, the system may adjust each frame and provide a stabilized video.

Figure 3:
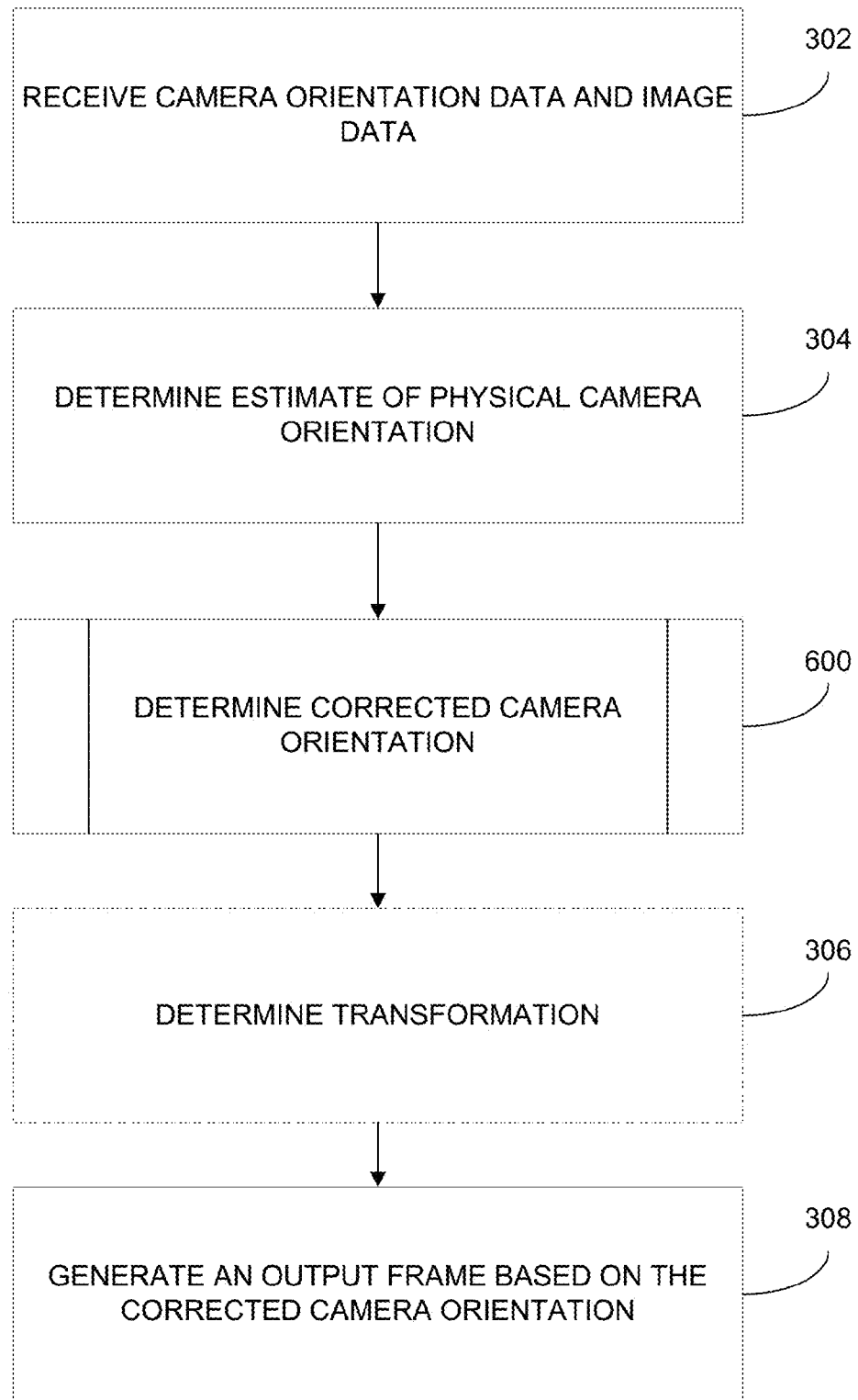
FIG. 3 is a flow diagram of a method, according to an example implementation.

FIG. 3 is a flow diagram of a method 300 according to an example implementation of the disclosed technology. As shown, the method 300 begins with a computing device receiving 302 camera orientation data and image data. According to some implementations, camera orientation data may include gyroscope data from a mobile device that may be indicative of a mobile device's yaw, pitch, and roll. In some implementations, camera orientation data may also include focal length sensor data from a mobile device that may be indicative of the focal length of a camera of the mobile device. In some implementations, camera orientation data may correspond to one or more frames of a digital video and/or one or more scanlines of a frame. According to some implementations, image data may be representative of one or more images of one or more input frames of a digital video. The method further includes determining 304 by a computing device, an estimate of the physical camera orientation for a frame or scan line based on the camera orientation data. For example, in some implementations, a computing device may determine a first and second physical camera orientation estimate based on the gyroscope data and that are associated with a first and second input frame, respectively. The method further includes determining 600 a corrected (or virtual) camera orientation for the same frame or scan line, as will be described in greater detail below. According to some implementations, once the physical camera orientation and virtual camera orientation for a particular frame or scan line have been determined, the method 300 may further includes determining 306 a transformation, such as a stabilization mesh, for generating a stabilized image from the input image. A stabilization mesh may be a grid that can be used to transform the real image (i.e., an image associated with the real camera orientation) to a virtual image (i.e., an image associated with the virtual camera orientation). The method 300 further includes generating 308 an output frame based on the corrected camera orientation. In some implementations, the output frame may be generated based on a transformation, such as a stabilization mesh. According to some implementations, the output frame may represent a stabilized version of a corresponding input frame, having, for example, undesired motion removed. In some implementations, the output frame may be displayed on a screen of a mobile device. After generating 308 the output frame, the method 300 ends. The system may use the data indicative of a stabilized image to map the pixels of the input frame to an output frame to create a stabilized output image. According to some implementations, the method 300 may be performed repeatedly on subsequent frames of a video in real time on a mobile device in order to generate a stabilized video.

Stabilization Mesh

Figure 4:
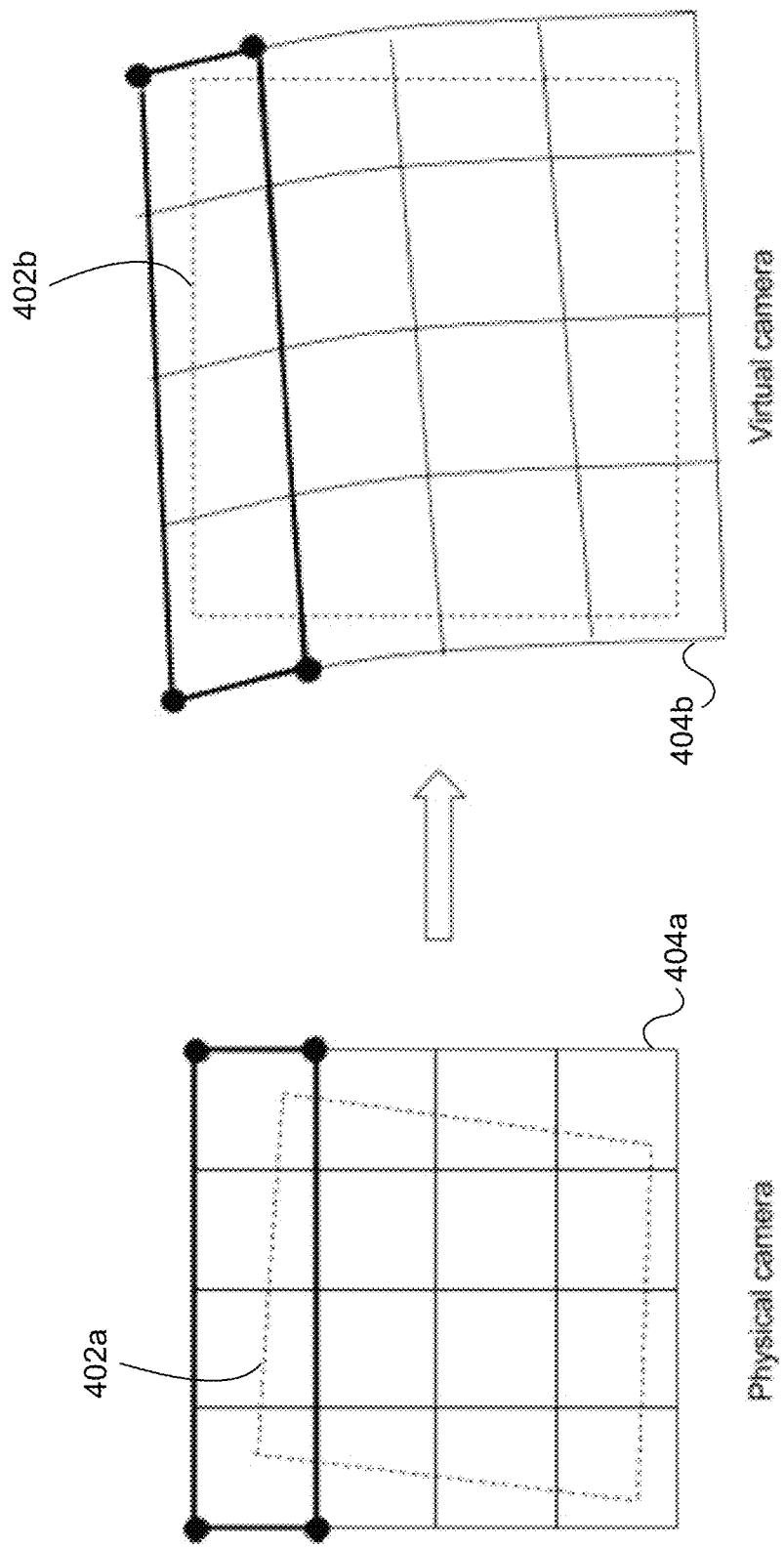
FIG. 4 illustrates a transformation from a physical camera image to a virtual camera image using a stabilization mesh, according to an example implementation.

As described above, according to example implementations, a stabilized image of an input video frame may be created by generating an estimate of a real camera orientation associated with a particular frame or scan line, determining a virtual camera orientation corresponding to the same frame or scan line, and then generating and applying a transformation to the input image associated with the real camera orientation to generate a stabilized image associated with the virtual camera orientation. According to some implementations, the transformation may include a stabilization mesh. FIG. 4 shows an illustration of how a stabilization mesh may be used to warp an input image 402a associated with the perspective of the real camera orientation to generate a stabilized image 402b associated with the perspective of the virtual camera orientation. As shown in FIG. 4, according to an example implementation, the input image 402a may be rotated to one side as a result of unintentional hand movement by a user when recording a video with a mobile device, but the stabilized image 402b may be devoid of this rotation. In some implementations, the stabilization mesh 404a, 304b may be made up of a grid having a plurality of regions, such as quadrilaterals. For example, the stabilization mesh shown in FIG. 4 is made up of a grid of four rows and four columns of rectangular boxes. The system may overlay the stabilization mesh on the image such that each point in the image lies within a region of the mesh. The system may overlay the input image 402a with the grid 404a such that each pixel of the input image 402a is positioned within a region of the grid 404a. According to some implementations, each vertex on the real image grid 404a is associated with a vertex on the virtual image grid 404b, forming a mapping mesh that may be used to transform the input image 402a to a stabilized output image 402b. According to some implementations, the stabilization mesh may be used to project pixels from a predetermined number of scanlines from the input image to an output image and may interpolate the projection of the remaining of the pixels using known techniques.

Although this disclosure generally refers to the use of a stabilization mesh as a transformation for mapping an input frame to an output frame, it is contemplated that in some implementations, a stabilization homography may be used instead of a stabilization mesh. A stabilization homography may be a global 3-by-3 transform between an input homogenous coordinate and an output homogenous coordinate. A stabilization homography may be less complex than a stabilization mesh and may provide lower quality than a stabilization mesh, but because it requires less parameters to transmit, it may increase the speed at which an output image may be generated. According to some implementations, the system may use stabilization homography by defining a rectangular box on the image plane of the physical camera, and determine the corresponding 2D coordinate in the virtual camera for each vertex using Equation (5) below. According to some implementations, a homography may be computed from input and output image quadrilaterals.

According to some implementations, an output image resulting from the transformation from the real camera image to the virtual camera image may have black boundaries around the edges if some image pixels become undefined during the mapping. Although this disclosure refers to black boundaries representing undefined pixels, it should be understood that undefined pixels may be represented by other colors, designs, or patterns, but for convenience the manifestation of undefined pixels are referred to as black boundaries herein. Accordingly, in some implementations, to avoid black boundaries around the edges of the output image, the system may crop the virtual camera image (i.e., output image) by a fixed margin. For example, the system may crop the virtual camera image by 10% on each side.

Figure 5:
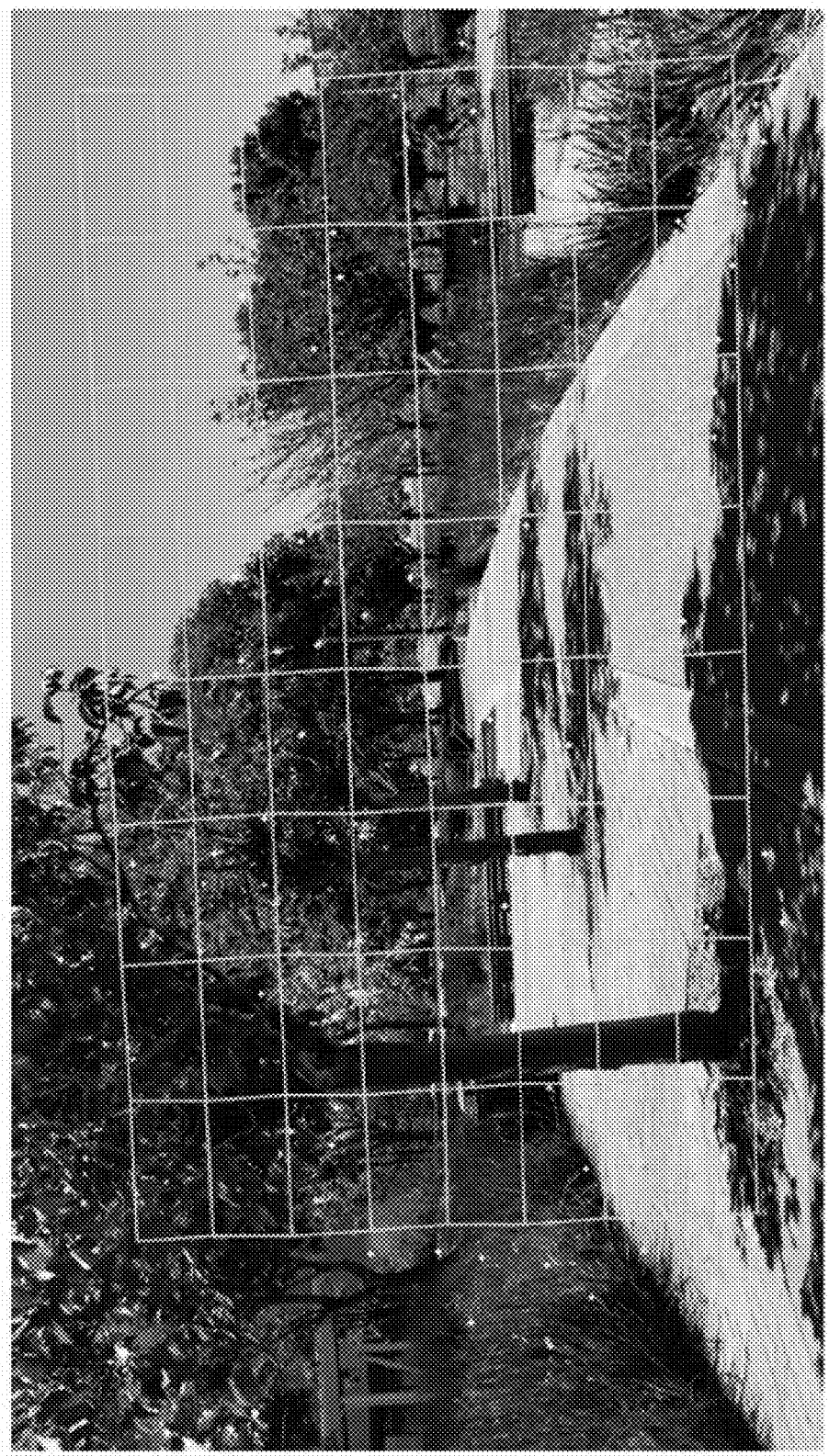
FIG. 5 is a example of an inverse stabilization mesh, according to an example implementation.

FIG. 5 shows an example of an inverse stabilization mesh (i.e., from output image to input image) illustrating how a portion of the edges of the input image are left out of the mesh and are therefore cropped in the output image.

Camera Model

According to some implementations, the systems and methods for providing improved video stabilization on a mobile device may use a camera model to aid in describing the relationship between a real image (i.e., an image taken from the perspective of the physical camera orientation) and a virtual image (i.e., an image created from the perspective of the virtual camera orientation). For example, in some implementations, a virtual image may represent an approximation for a corresponding real image that has been adjusted to remove distortions caused by unwanted motion that occurred during recording. According to some implementations, the system may project pixels (i.e., points) from a 2-dimensional real image (i.e., an image from a recorded video) into a 3-dimensional space, and the system may then project the pixels onto a 2-dimensional virtual ("2D") image after accounting for the effects of the movement of the camera on the pixels in the 3-dimensional space. In some implementations, this model may be described by Equation (1):

$$x = K(t)R(t)X, \quad (1)$$

where x may represent a 2D image point in a homogeneous coordinate system and X may represent the corresponding point in a three-dimensional ("3D") coordinate system. K(t) may be the camera intrinsic matrix at time t, and R(t) may be the camera rotation matrix at time t. The camera intrinsic matrix may be used in transforming points between 3-dimensional space and a 2-dimensional image plane. According to some implementations, the intrinsic matrix K(t) may be:

$$K(t) = \begin{bmatrix} f(t) & 0 & o_x \\ 0 & f(t) & o_y \\ 0 & 0 & 1 \end{bmatrix} \quad (2)$$

where f(t) may be the focal length at time t, and ($o_x$, $o_y$) may be the principal point in 2D image coordinates. According to some implementations, focal length may be modeled as a function of time because the distance between the lens of the camera of the mobile device and the focal length sensor may change due to focus adjustment or focus breathing (i.e., lens movement). As described above, a computing device may receive a signal from a focal length sensor that provides data indicative of changes in focal length of the camera over time. In some implementations, if the focal length may be set to be a constant, in which case the systems and methods described herein may provide an improved stabilized video without correcting for distortions caused by focus breathing.

In some implementations, the intrinsic matrix and rotation matrix for the physical camera may be denoted by $K_p(t)$ and $R_p(t)$ respectively. Similarly, the intrinsic matrix and rotation matrix for the virtual camera may be denoted by $K_v$ and $R_v(t)$. In some implementations, $q_p(t)$ and $q_v(t)$ may be used to denote the quaternion representation of $R_p(t)$ and $R_v(t)$ respectively. According to some implementations, $K_v$ may be a constant (independent of time) so that the same field-of-view (FOV) may be maintained in the stabilized videos, regardless of lens movement. According to some implementations, the projected image point from X for the physical camera is:

$$x_p = K_p(t)R_p(t)X, \quad (3)$$

and the projected image point for the virtual camera is $$x_v = K_v R_v(t)X \quad (4)$$

Equations (3) and (4) may be combined to yield:

$$x_v = K_v R_v(t) R_p^{-1}(t) K_p^{-1}(t) x_p \quad (5)$$

According to some implementations, the system may obtain $K_p(t)$ from the camera lens position, which the system may derive from camera sensor data received from the focal length sensor of the mobile device. In some implementations, $K_v$ may be predetermined. For example, in some implementations, $K_v$ may be equal to the intrinsic matrix of the physical camera when the lens is focusing at infinity. According to some implementations, once $R_p(t)$ and $R_v(t)$ are known, the system may determine the coordinate of the 2D image point in the virtual camera for any 2D point in physical camera using Equation (5).

Physical Camera Orientation

As described above, the system may determine an estimate of the physical or real camera orientation $R_p(t)$ of the camera in the mobile device for a particular frame or scan line using data obtained from a gyroscope of the mobile device. It will be appreciated by those of skill in the art that many modern digital cameras use a rolling shutter, which means that each frame of the video is captured by rapidly scanning horizontally or vertically across the scene, as opposed to capturing the entire scene at once. As such, each frame of a video may have a plurality of scan lines that are scanned in succession at slightly different times. Accordingly, if the mobile device is in motion, each individual scan line may be associated with a different physical camera orientation $R_p(t)$. Thus, although portions of this disclosure may refer to a physical or virtual camera orientation associated with a frame of the video, it should be understood that each frame may have a number of associated physical and virtual camera orientations that are associated with each scan line of the frame. In some implementations, a computing device may continuously receive the gyroscope signal to estimate the most recent real camera orientation. In some implementations, the gyroscope signal may be fetched or received by the computing device at a high frequency, such as 200 Hz, for example. Although it should be understood that different frequencies may be used according to different implementations. According to some implementations, when a gyroscope sample arrives at time $t_n$, the system may calculate the rotation of the camera relative to the camera orientation at previous gyro timestamp $t_{n-1}$. In some implementations, the system may first convert the rotational speed (derived by the system from gyroscope data) and time interval (i.e., the difference between current gyroscope timestamp and previous gyroscope timestamp) to a rotation in axis-angle representation. In some implementations, the system may then convert this axis angle representation of relative rotation to quaternion, which may be denoted as $r_p(t_n)$. According to some implementations, the system may then compute the real camera orientation at the current gyroscope timestamp $q_p(t_n)$ as the quaternion product between orientation at previous gyroscope timestamp $q_p(t_{n-1})$ and the relative rotation as:

$$q_p(t_n) = r_p(t_n) * q_p(t_{n-1}) \quad (6)$$

This quaternion product is noncommutative. According to some implementations, to obtain an estimate of the camera orientation $q_p(t)$ for any time t from the discrete samples by Equation (6), the system may find the two orientations $q_p(t_1)$ and $q_p(t_2)$ with $t_1$ and $t_2$ being two timestamps closest to t and $t_1 \le t \le t_2$, and perform spherical linear interpolation (SLERP) of $q_p(t_1)$ and $q_p(t2)$. According to some implementations, after determining an estimate of the real camera orientation, the system may determine a corresponding virtual camera orientation.

Virtual Camera Orientation

Figure 6:
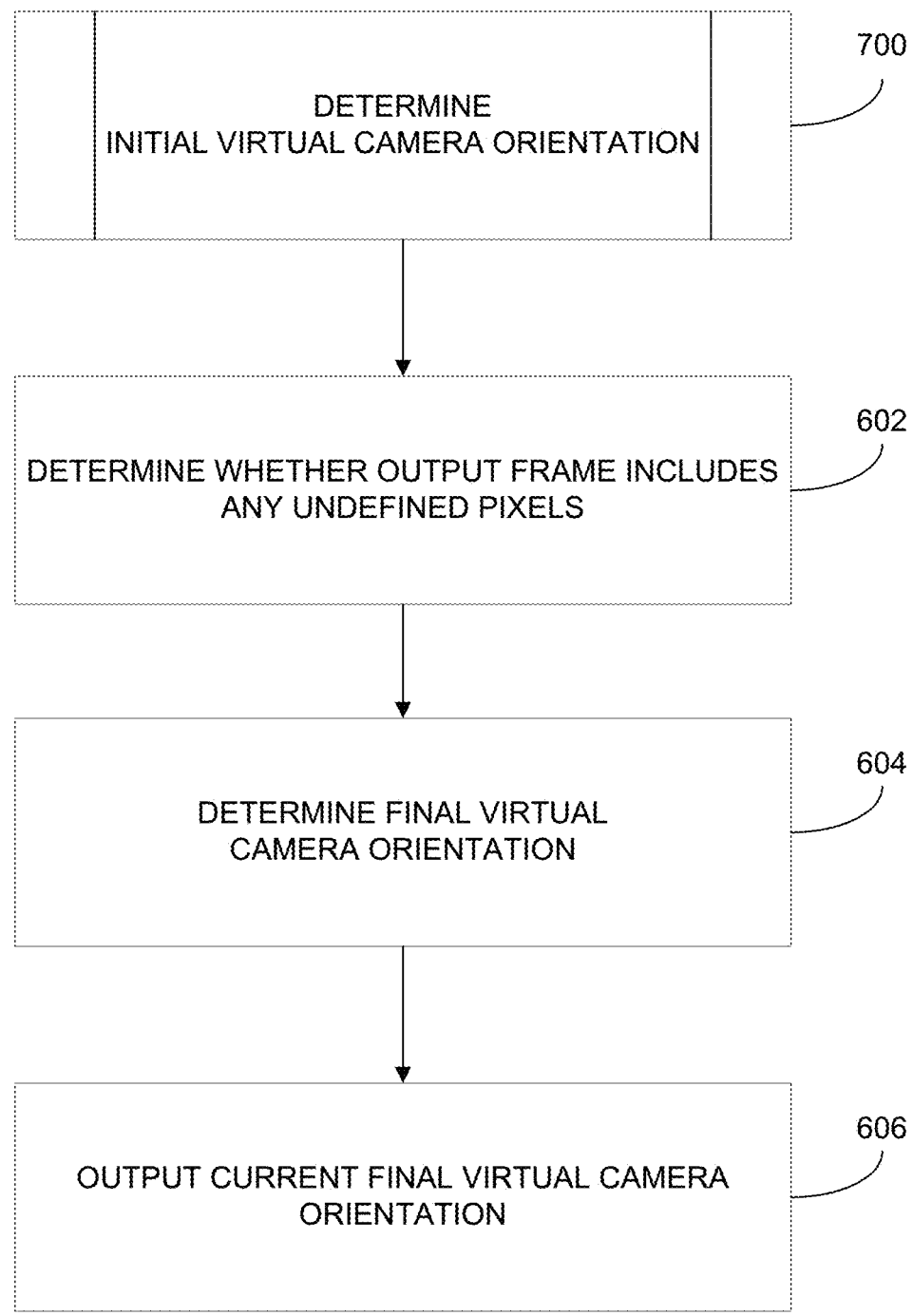
FIG. 6 is a flow diagram of a method, according to an example implementation.

FIG. 6 is a flow diagram of a method 600 according to an example implementation of the disclosed technology. As shown, the method 600 begins with determining 700 an initial virtual camera orientation of a frame or scan line corresponding to a real camera orientation of the same frame or scan line. According to some implementations, the system may determine an initial virtual camera orientation based on an estimate of the real camera orientation as well as a virtual camera orientation of one or more previous input frames and/or corresponding scan lines of the video. According to some implementations, the method 600 may further include determining 602 whether an output frame generated using the initial virtual camera orientation would include any undefined pixels. In some implementations, determining whether the output frame would include any undefined pixels may include making a determination as to whether the bounds of the output frame would be fully covered by the stabilization mesh if the input image were to be warped to the virtual image using the stabilization mesh. According to some implementations, if an output frame includes undefined pixels, it may be desirable to adjust the initial virtual camera orientation to prevent the inclusion of undefined pixels in the output frame. Accordingly, according to some implementations, the method 600 may further include determining 604 a final virtual camera orientation. According to some implementations, the system may determine a final virtual camera orientation by adjusting the initial virtual camera orientation by blending the initial virtual camera orientation with the corresponding real camera orientation in response to a determination that use of the initial virtual camera orientation in creating an output image would result in undefined pixels. The method may further include outputting 606 data representative of the final virtual camera orientation, which may be utilized in generating an output image from an input image of the video.

As described above, the system may determine a virtual camera orientation $R_v(t)$ (or $q_v(t)$ for the quaternion representation) that may be used in generating a stabilized output image from an input image obtained at a corresponding real camera orientation. In some implementations, the system may use a nonlinear filter to determine the virtual camera orientation. According to some implementations, the system may use the same $q_v(t)$ for the entire frame readout time to remove the rolling shutter effect. This means:

$$q_v(t)=q_v[n], \, t \in [t_{n,0}, t_{n,h}], \quad (7)$$

where $t_{n,0}$ is the timestamp of a first scan line at frame n, and $t_{n,h}$ is the timestamp of a last scan line at frame n. Therefore, the system may use a discrete time representation $q_v[n]$ for the virtual camera orientation. According to some implementations, the frequency of the video frames may be different to the frequency of the gyroscope event in Equation (6).

Proposing Initial Virtual Camera Orientation

According to some implementations, a method for providing improved video stabilization on a mobile device may include determining, by the system, an initial or proposed virtual camera orientation corresponding to a frame or scan line before generating a final virtual camera orientation corresponding to the frame or scan line, as described below. In some implementations, determining an initial virtual orientation may include making a determination if the camera is panning or remaining still and projecting the camera's movement based on historical camera orientation data. Historical camera orientation data may include stored data indicative of estimates of physical camera orientations corresponding to previous inputs frames and/or scan lines of the video as well as the corresponding virtual camera orientations. According to some implementations, if the system determines that the camera is not panning (e.g., the panning probability is zero), than the system may set an initial virtual camera orientation corresponding to an input frame to be the same as the virtual camera orientation corresponding to the previous frame of the video.

Figure 7:
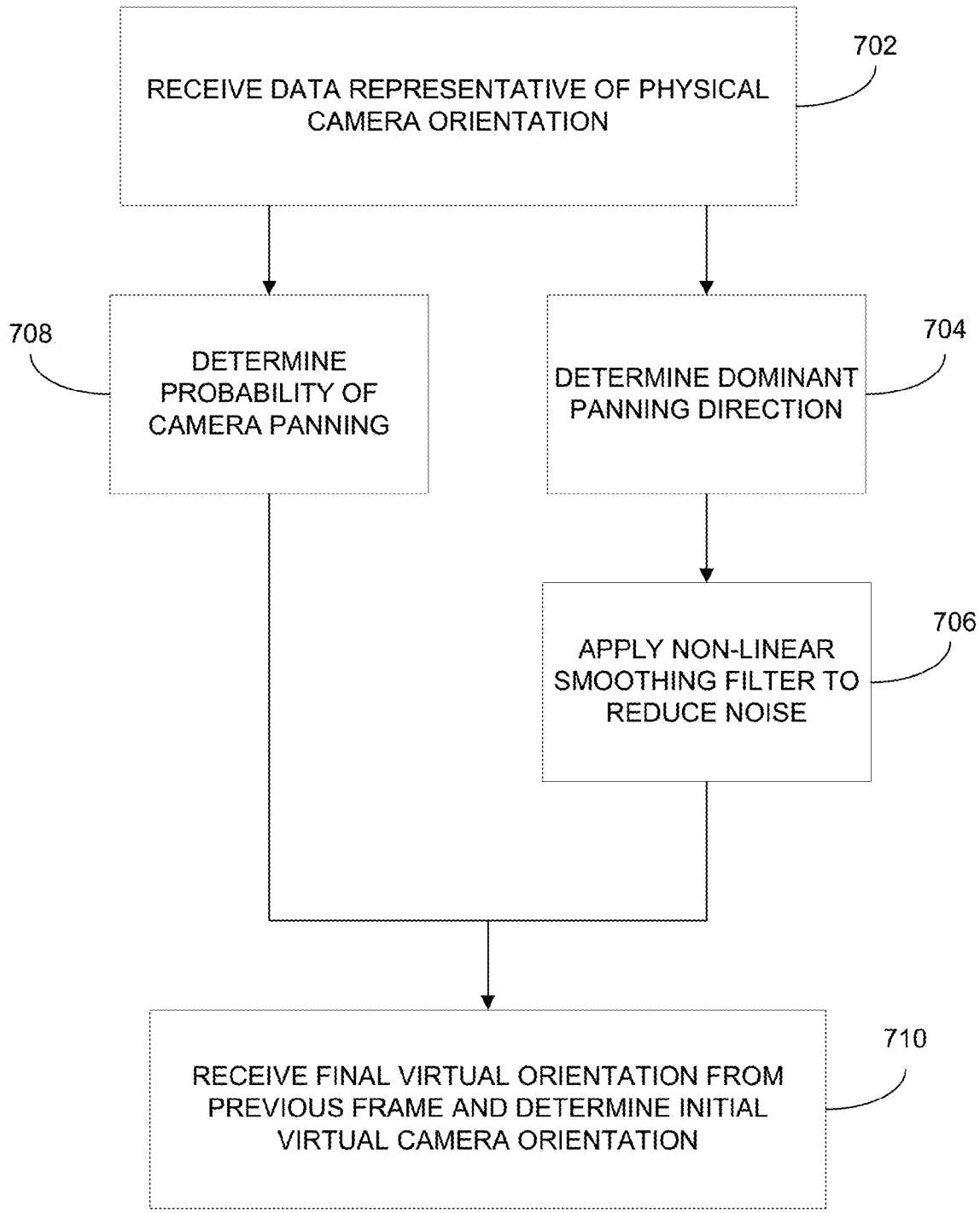
FIG. 7 is a flow diagram of a method, according to an example implementation.

FIG. 7 is a flow diagram of a method 700 according to an example implementation of the disclosed technology. As shown, the method 700 begins with a computing device receiving 702 data representative of a physical camera orientation. For example, according to some implementations, the computing device may receive gyroscope data from a gyroscope interface of the mobile device and focal length data from a focal length sensor of the mobile device. The method 700 further includes determining 704 the dominant panning direction of the camera. According to some implementations, the computing device may determine the dominant panning direction based on the gyroscope data. According to some implementations, the system may compute an initial or proposed virtual camera rotation at frame n relative to the previous frame n−1 as follows:

$$r_v[n] = \text{Slerp}(r_0, \overline{r_p[n]}, p[n]), \quad (8)$$

where $r_0$ represents no rotation or [0, 0, 0, 1] in quaternion representation, $\overline{r_p[n]}$ represents domain transform filtered physical camera motion projected to the dominant motion direction, and p[n] is the panning probability. Accordingly, in some implementations, the initial virtual camera orientation (which may also be referred to as the proposed virtual camera orientation) in quaternion $\hat{q}_v[n]$ can be computed as:

$$\hat{q}_v[n] = r_v[n] * \hat{q}_v[n-1], \quad (9)$$

where, according to some implementations, the system may initialize the proposed virtual camera orientation at first frame $\hat{q}_v[0]$ to be the physical camera orientation at first frame center centerline:

$$\hat{q}_v[0] = q_P\left(\frac{t_{0,0} + t_{0,h}}{2}\right)$$

The method 700 may further include applying 706 a non-linear smoothing filter to data indicative of the physical camera movement to filter the physical camera motion and eliminate noise. In some implementations, the system may use a domain transform to filter the physical camera motion. According to some implementations, use of the domain transform to filter the physical camera motion may make the virtual camera more responsive to the start and stop of physical camera panning. In some implementations, the system may use other edge aware filters to filter the physical camera motion.

The method 700 further includes determining 708 a probability of whether the camera is panning. For example, in some implementations, the system may utilize a logistic regression using previous camera orientation data to determine a panning probability S representing the likelihood that the camera is panning. The panning probability may be any number from 0 to 1, with 0 representing a stationary camera and 1 representing a panning camera. For example, a panning probability might be 0.8. In some implementations, the system may use logistic regression to perform panning detection. According to some implementations, the system may extract gyroscope data from a windowed time frame, obtain the average μ and standard deviation σ of the gyroscope data from this window, and compute a feature $$l = \frac{\mu}{\sigma + \varepsilon},$$

where ε may be used to avoid numerical instability when σ is very small. In some implementations, the system may use a logistic regression function that takes l as input and generates the panning probability p[n] in Equation (8):

$$p[n]=1/(1+\exp(-(\beta_1+l\cdot\beta_2))), \quad (10)$$

where, according to some implementations, $\beta_1$ and $\beta_2$ are obtained by training data. In some implementations, $\beta_1$ and $\beta_2$ may be selected by a user or system administrator.

The method 700 may further include determining 710 an initial virtual camera orientation based on the smoothed camera rotation, the panning probability, and the previous virtual camera orientation of the previous frame. Accordingly, in some implementations, the computing device may repeatedly store historical data pertaining to real camera orientations and virtual camera orientations in memory and may access this historical data from memory at any time during the execution of the methods described herein. According to some implementations, once an initial virtual camera orientation is proposed by the system, it may be necessary for the system to determine if use of a stabilization mesh corresponding to the real camera orientation and the proposed virtual camera orientation may result in undefined pixels in the appearing in the output image. If so, the system may modify the initial virtual camera orientation to create a final virtual camera orientation that eliminates the undefined pixels, thereby preventing undesired black boundaries from showing up in the output image.

Determining Protrusion and Finalizing Virtual Camera Orientation

As mentioned previously above, in some implementations it may be necessary to crop the virtual camera image by a fixed margin to prevent a black boundary of undefined pixels from showing up in the output image after the input image is warped according to the stabilization mesh. Thus, according to some implementations, the system may test the output image that results from mapping the real camera image to the proposed virtual camera orientation using the stabilization mesh to determine whether the proposed virtual camera orientation needs to be modified to eliminate undefined pixels that occur after the stabilization mesh is applied. According to some implementations, if the system determines that using a proposed virtual camera orientation will result in undefined pixels in the resultant output image, then the system may adjust the proposed virtual camera orientation by blending the proposed virtual orientation with the real camera orientation to determine a final virtual camera orientation. According to some implementations, blending of the proposed virtual camera orientation and the real camera orientation may be performed using a binary search.

According to some implementations, to prevent the black boundary in the stabilized frame, the system may verify that the warped image bounding box in the physical camera image covers the entire image area in the virtual camera image, or conversely, that the warped image bounding box in the virtual camera image stays instead the image are of the physical camera image. In some implementations, the system may achieve this goal by adjusting the virtual camera orientation to more closely resemble the physical camera orientation using SLERP. According to some implementations, the minimum SLERP $\lambda_1[n]$ coefficient needed to avoid black boundaries may be found by using a binary search.

Figure 8:
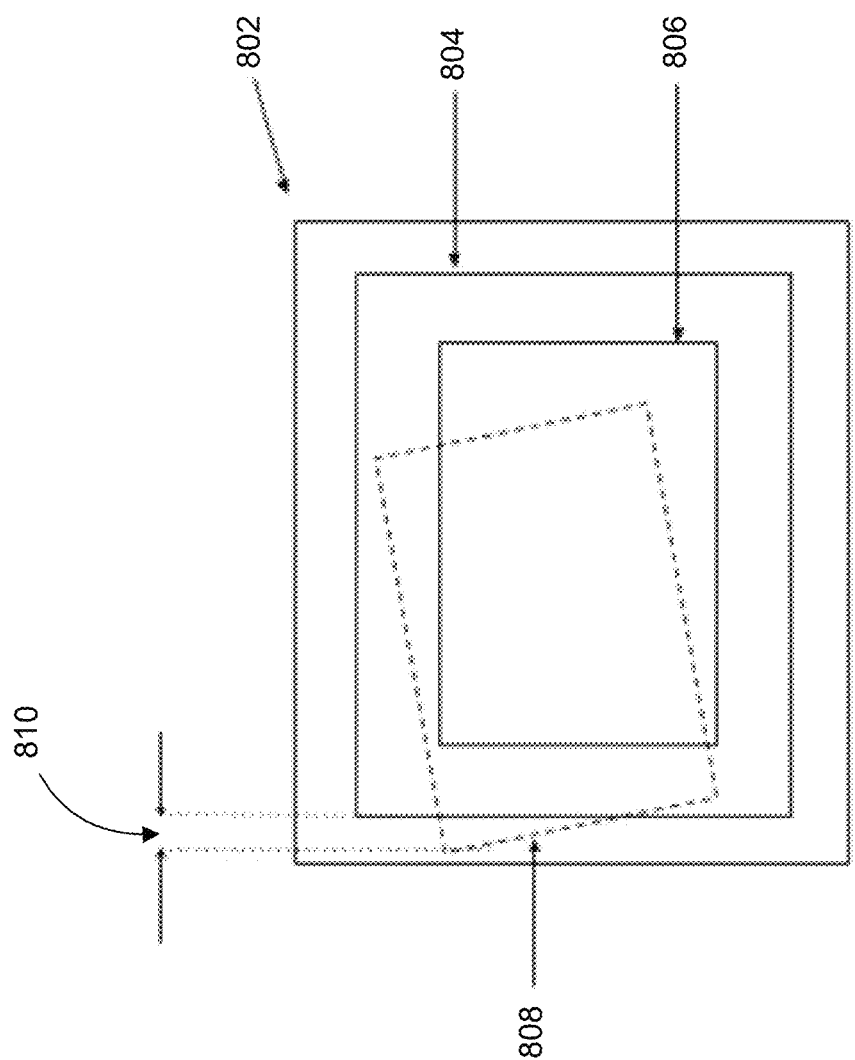
FIG. 8 illustrates a protrusion resulting from a virtual-to-real transform, according to an example implementation.

As previously described, it may be desirable to adjust the virtual camera orientation such that it is closer to the physical camera orientation whenever there is a tendency of the pixels to go out of bounds to prevent a black border of undefined pixels arising in the virtual camera image. In some implementations, the tendency of the pixels to go out of bounds may be quantified by the amount of protrusion introduced by the stabilization mesh. The concept of the protrusion is illustrated in FIG. 8. FIG. 8 shows a representation of the image boundary 802 of the virtual camera, represented by the outermost box. According to some implementations, the system may define an outer box 804 and an inner box 806 within the image boundary 802 of the virtual camera. In some implementations, the respective sizes of the outer box 804 and inner box 806 may be parameters that may be tuned to achieve different results. According to some implementations, the system may transform the inner box 806 according to a homography transform from the virtual camera orientation to the physical camera orientation to generate the warped box 808. In some implementations, the system may determine the maximum protrusion 810 outside of the outer box 804 among all vertices of the warped box 808. According to some implementations, the system may determine the physical and virtual camera homography from the source and destination quadrilaterals for each horizontal stripe for a physical to virtual stabilization mesh as shown in FIG. 4, and invert the homography to generate the virtual to physical homography to be used in determining the protrusion. According to some implementations, the system may normalize the image size to [0, 1]×[0, 1] before computing the protrusion. In some implementations, the system may use δ[n] to denote the protrusion amount at frame n. In some implementations the system may compute a SLERP coefficient $\lambda_2[n]$ as:

$$\lambda_2[n] = \left(\frac{\delta[n]}{\beta}\right)^\alpha \quad (11)$$

where α and β are predetermined constants. For example, in some implementations, the system may use α=2, β=0.2. According to some implementations, the SLERP coefficient $\lambda_2[n]$ may be smoothed using an IIR filter:

$$\lambda_3[n]=\gamma\cdot\lambda_3[n-1]+(1-\gamma)\cdot\lambda_2[n], \quad (12)$$

where γ is a predetermined constant. This smoothing may make videos with drastic motion such as running scenes look more natural and pleasing.

According to some implementations, the system may determine the final virtual camera orientation as:

$$q_v[n] = Slerp(\hat{q}_v[n], q_p[n], \max(\lambda_1[n], \lambda_3[n])), \qquad (13)$$

where $$q_p[n] = q_p\left(\frac{t_{n,0} + t_{n,h}}{2}\right)$$

According to some implementations, after the system determines the physical and virtual camera orientations for a particular frame or scan line, the system may obtain the stabilization mesh to warp the input frame or scan line to achieve video stabilization and rolling shutter correction.

Results

Figure 9:
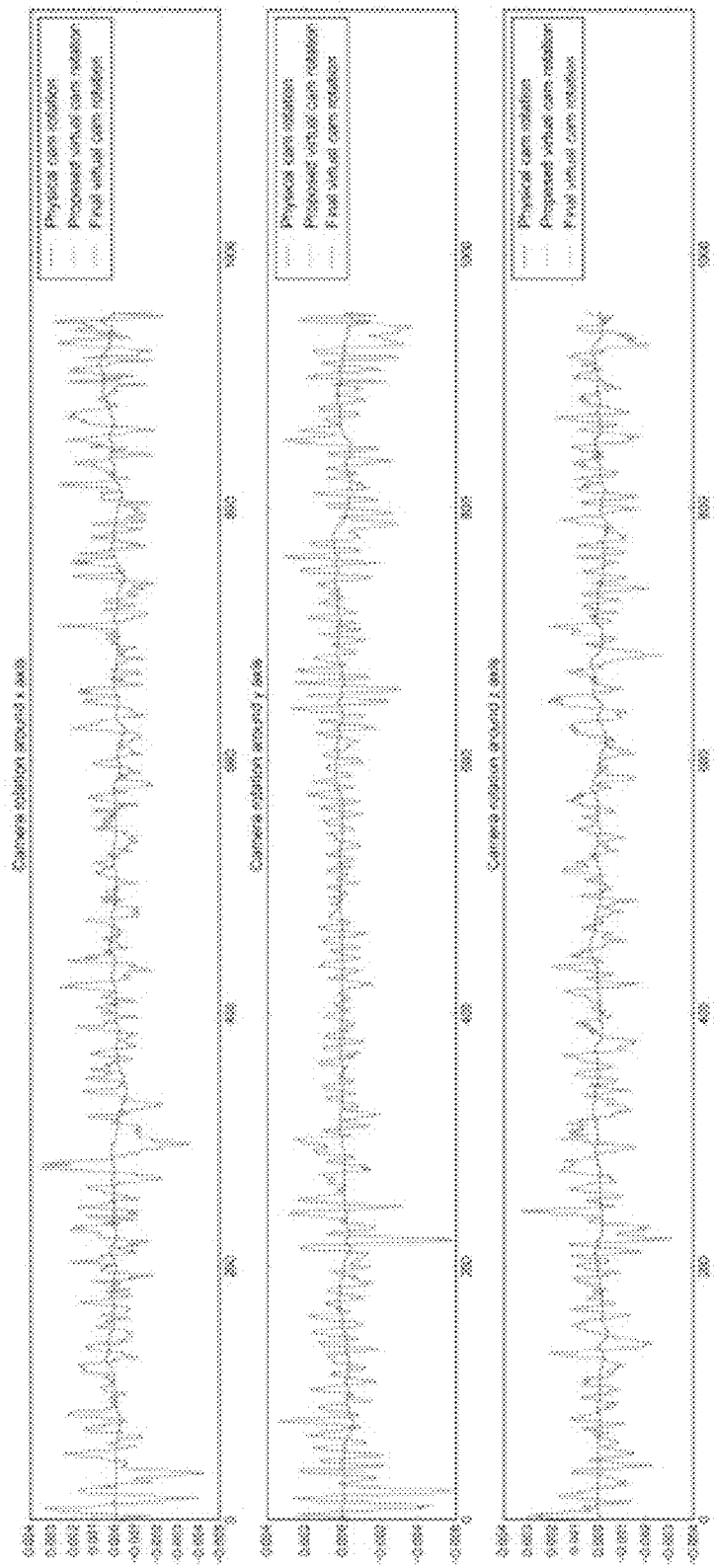
FIG. 9 is a chart of results comparing actual camera motion to stabilized camera motion of a handheld video taken while the user was stationary, according to an example implementation.
Figure 10:
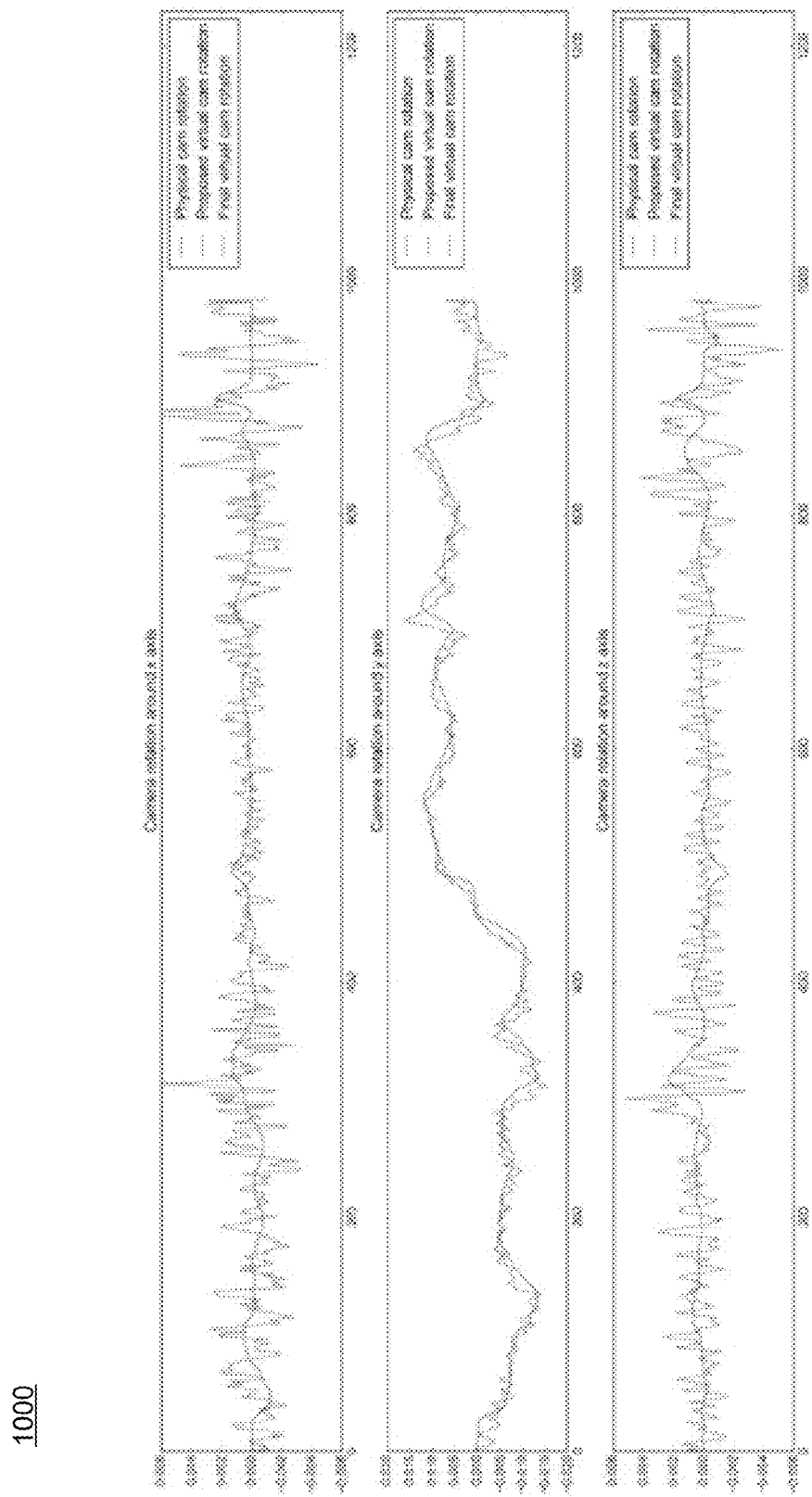
FIG. 10 is a chart of results comparing actual camera motion to stabilized camera motion of a handheld video taken while the user was panning, according to an example implementation.
Figure 11:
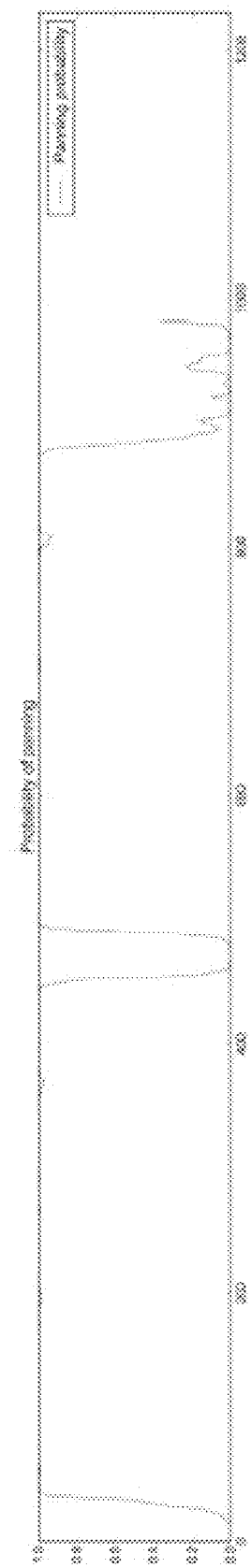
FIG. 11 is a chart of the probability of panning calculated for the stabilized video of FIG. 10, according to an example implementation.
Figure 12:
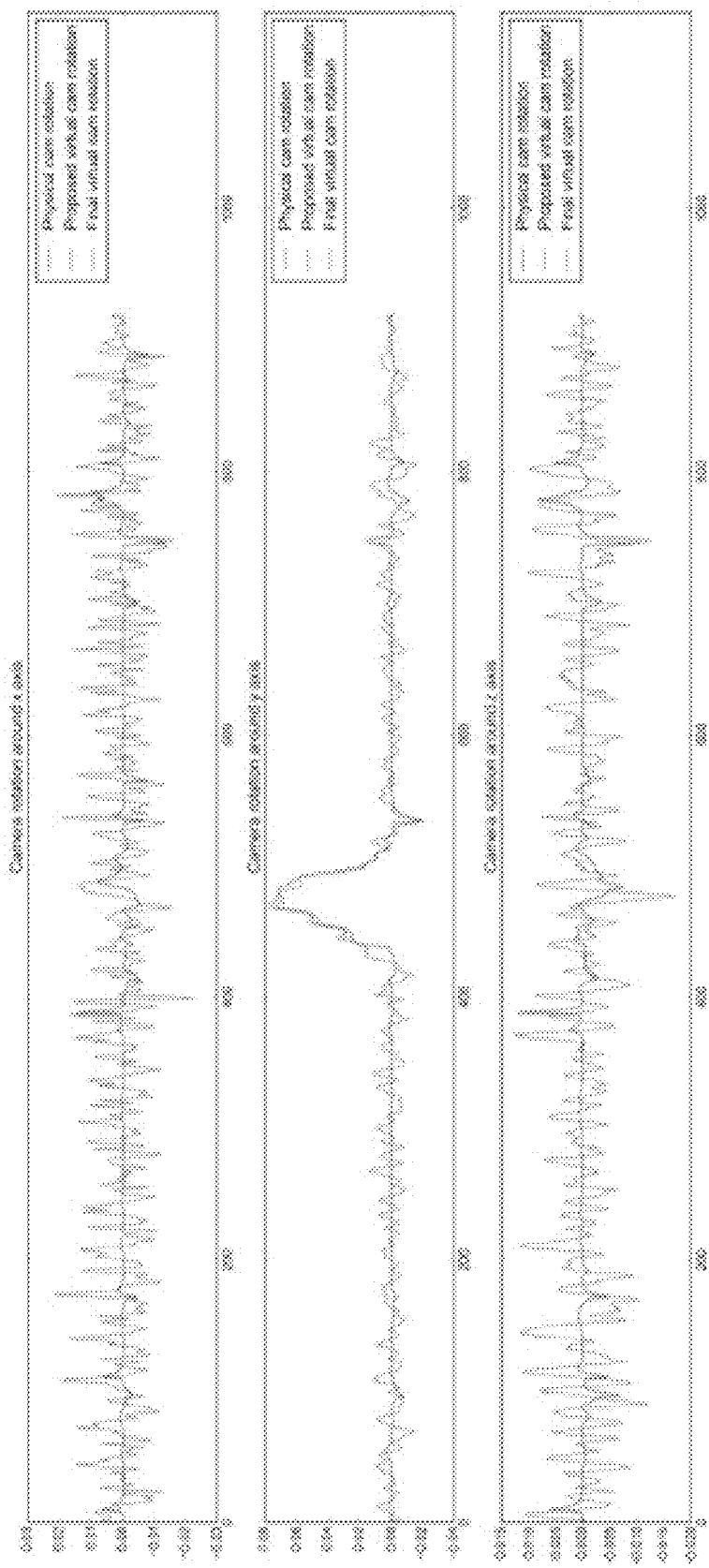
FIG. 12 is a chart of results comparing actual camera motion to stabilized camera motion of a handheld video taken while the user was walking and panning, according to an example implementation.
Figure 13:
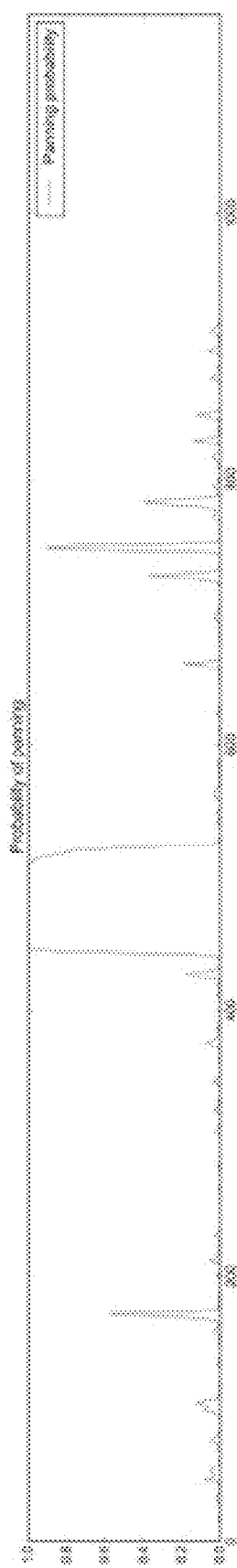
FIG. 13 is a chart of the probability of panning calculated for the stabilized video of FIG. 12, according to an example implementation.
Figure 14:
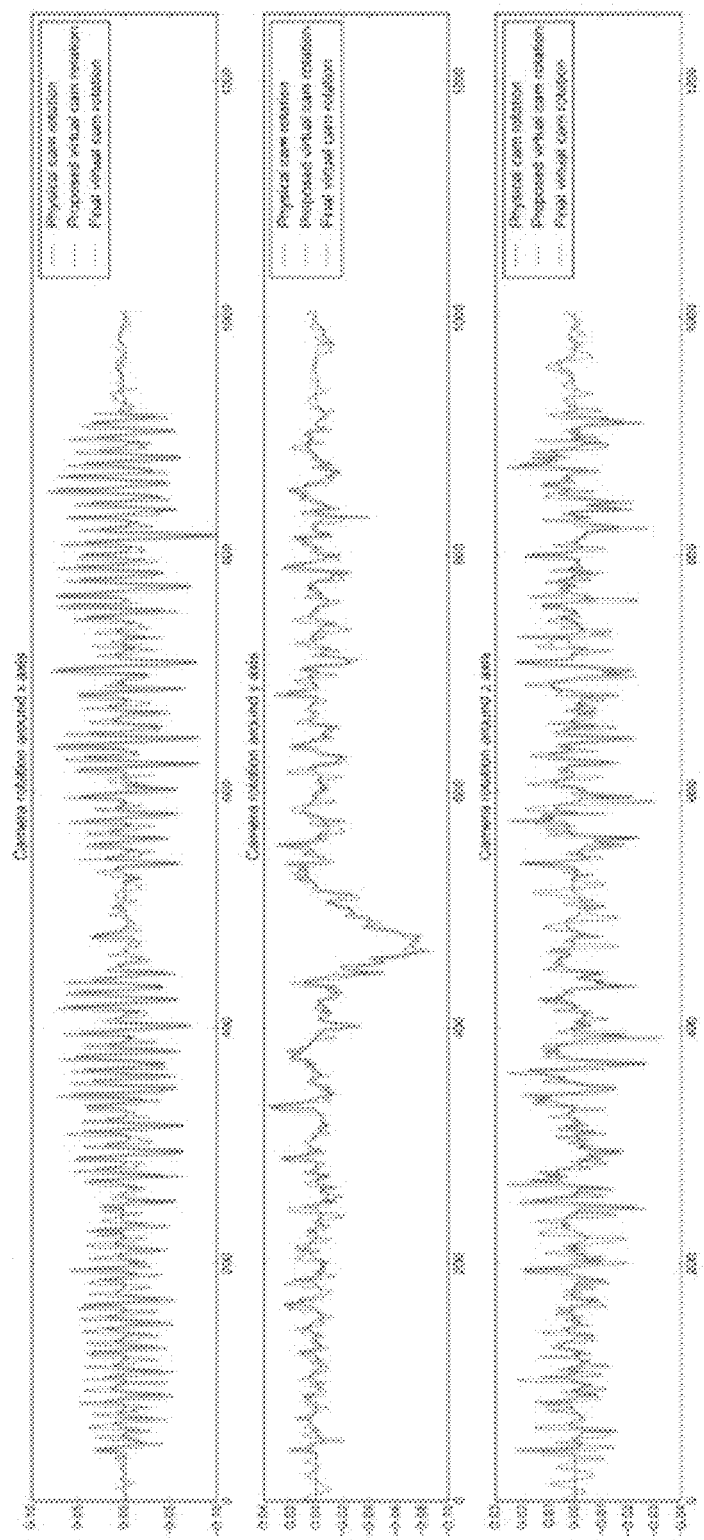
FIG. 14 is a chart of results comparing actual camera motion to stabilized camera motion of a handheld video taken while the user was running, according to an example implementation.

The systems, methods, and techniques described herein have been implemented in various test cases with the results shown in charts representing actual rotation of the mobile device about the x, y, and z-axes, compared to the rotation of the stabilized videos. For example, FIG. 9 shows the results of a video of a typical handheld video where the user is stationary. As is shown in the charts in FIG. 9, the filtered video generated from the virtual camera orientations shows significant elimination of camera rotation, producing a very stable video image. FIG. 10 shows the results of a video where the user is panning with the corresponding calculated probability of panning shown in FIG. 11. As shown by the charts, the stabilized video of the panning scene shows a significant increase in the smoothness of the video quality. FIG. 12 shows the results of a video where the user is walking and panning with the corresponding calculated probability of panning shown in FIG. 13. As shown in the charts in FIG. 13, the method described herein does well at stabilizing this type of video as well. The chart in FIG. 13 does show some occasional fast motion, however the parameters of the method may be tuned by, for example, adjusting the outer box 804 margin shown in FIG. 8 to make the video look more natural. Lastly, FIG. 14 shows the results of a video taken while the user was running, which presents drastic camera motion that is challenging to stabilize because there is only a limited amount of cropping that can be used and when the motion is large, it is easy for the crop region to hit the image boundary. However, as shown in the charts in FIG. 14, despite the drastic motion of the video, the methods described herein performed well to reduce the amount of hand shaking from the video.

It will be understood that the various steps shown in FIGS. 3, 6, and 7 are illustrative only, and that steps may be removed, other steps may be used, or the order of steps may be modified.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain implementations of the disclosed technology have been described in connection with what is presently considered to be the most practical implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method comprising:
   receiving, by a computing device, first gyroscope data and first image data representative of a first input frame associated with a camera;

receiving, by the computing device, second gyroscope data and second image data representative of a second input frame associated with the camera;

determining, by the computing device and based on the first gyroscope data, a first physical camera orientation estimate, the first physical camera orientation estimate being associated with the first input frame;

determining, by the computing device and based on the second gyroscope data, a second physical camera orientation estimate, the second physical camera orientation estimate being associated with the second input frame;

determining, by the computing device and based on the second physical camera orientation estimate, a corrected camera orientation associated with the second input frame, wherein the corrected camera orientation associated with the second input frame represents a camera orientation adjusted to remove unintended camera movement; and generating, by the computing device, an output frame based on the corrected camera orientation associated with the second input frame.

2. The method of claim 1, wherein the first physical camera orientation estimate comprises data representative of the yaw, pitch, and roll of the camera.

3. The method of claim 1, further comprising determining, by the computing device and based on the corrected camera orientation associated with the second input frame and the second physical camera orientation estimate, a transformation for mapping pixels of the second input frame to the output frame.

4. The method of claim 3, wherein the transformation comprises a stabilization mesh.

5. The method of claim 1, wherein the determining of the corrected camera orientation associated with the second input frame comprises:

determining, by the computing device, an initial corrected camera orientation associated with the second input frame;

determining, by the computing device, whether an output frame generated using the initial corrected camera orientation associated with the second input frame includes any undefined pixels; and determining, by the computing device, a final corrected camera orientation associated with the second input frame, wherein the corrected camera orientation associated with the second input frame is the final corrected camera orientation associated with the second input frame.

6. The method of claim 5, wherein determining whether the output frame generated using the initial corrected camera orientation associated with the second input frame includes any undefined pixels comprises determining whether a stabilization mesh overlaid on an image of the second input frame will entirely cover an entire image area of the output frame generated using the initial corrected camera orientation.

7. The method of claim 5, wherein determining the final corrected camera orientation associated with the second input frame includes responsive to determining that the output frame generated using the initial corrected camera orientation associated with the second input frame includes undefined pixels, blending, by the computing device, the initial corrected camera orientation associated with the second input frame with the second physical camera orientation estimate to generate the final corrected camera orientation.

8. The method of claim 5, wherein determining the initial corrected camera orientation associated with the second input frame includes determining, by the computing device and based on a logistic regression including the first gyroscope data and the second gyroscope data, a probability of camera panning.

9. The method of claim 8, wherein responsive to determining that the probability of panning is zero, determining that the initial corrected camera orientation associated with the second input frame is the same as a corrected camera orientation associated with the first input frame.

10. The method of claim 9, wherein determining the initial corrected camera orientation associated with the second input frame includes determining, by the computing device and based on historical camera orientation data, a smoothed approximation of the camera rotation using a non-linear smoothing filter.

11. A system comprising:
one or more processors;
a memory coupled to the one or more processors and storing instructions that, when executed by the one or more processors, cause the system to perform a method that comprises:

receiving, by a computing device, first gyroscope data and first image data representative of a first input frame associated with a camera;

receiving, by the computing device, second gyroscope data and second image data representative of a second input frame associated with the camera;

determining, by the computing device and based on the first gyroscope data, a first physical camera orientation estimate, the first physical camera orientation estimate being associated with the first input frame;

determining, by the computing device and based on the second gyroscope data, a second physical camera orientation estimate, the second physical camera orientation estimate being associated with the second input frame;

determining, by the computing device and based on the second physical camera orientation estimate, a corrected camera orientation associated with the second input frame, wherein the corrected camera orientation associated with the second input frame represents a camera orientation adjusted to remove unintended camera movement; and generating, by the computing device, an output frame based on the corrected camera orientation associated with the second input frame.

12. The system of claim 11, wherein the determining of the corrected camera orientation associated with the second input frame comprises:

determining, by the computing device, an initial corrected camera orientation associated with the second input frame;

determining, by the computing device, whether an output frame generated using the initial corrected camera orientation associated with the second input frame includes any undefined pixels; and determining, by the computing device, a final corrected camera orientation associated with the second input frame, wherein the corrected camera orientation associated with the second input frame is the final corrected camera orientation associated with the second input frame.

13. The system of claim 12, wherein determining the initial corrected camera orientation associated with the second input frame includes determining, by the computing device and based on a logistic regression including the first gyroscope data and the second gyroscope data, a probability of camera panning.

14. The system of claim 13, wherein determining whether the output frame generated using the initial corrected camera orientation associated with the second input frame includes any undefined pixels comprises determining whether a stabilization mesh overlaid on an image of the second input frame will entirely cover an entire image area of the output frame generated using the initial corrected camera orientation.

15. The system of claim 13, wherein responsive to determining that the probability of panning is zero, determining that the initial corrected camera orientation associated with the second input frame is the same as a corrected camera orientation associated with the first input frame.

16. The system of claim 14, wherein determining the initial corrected camera orientation associated with the second input frame includes determining, by the computing device and based on historical camera orientation data, a smoothed approximation of the camera rotation using a non-linear smoothing filter.

17. A non-transitory computer-readable medium storing instructions that, when executed by at least one processor, causes the at least one processor to perform a method comprising:
   receiving, by a computing device, first gyroscope data and first image data representative of a first input frame associated with a camera;
   receiving, by the computing device, second gyroscope data and second image data representative of a second input frame associated with the camera;
   determining, by the computing device and based on the first gyroscope data, a first physical camera orientation estimate, the first physical camera orientation estimate being associated with the first input frame;
   determining, by the computing device and based on the second gyroscope data, a second physical camera orientation estimate, the second physical camera orientation estimate being associated with the second input frame;
   determining, by the computing device and based on the second physical camera orientation estimate, a corrected camera orientation associated with the second input frame, wherein the corrected camera orientation associated with the second input frame represents a camera orientation adjusted to remove unintended camera movement; and
   generating, by the computing device, an output frame based on the corrected camera orientation associated with the second input frame.

18. The non-transitory computer-readable medium of claim 17, wherein the determining of the corrected camera orientation associated with the second input frame comprises:
   determining, by the computing device, an initial corrected camera orientation associated with the second input frame;
   determining, by the computing device, whether an output frame generated using the initial corrected camera orientation associated with the second input frame includes any undefined pixels; and
   determining, by the computing device, a final corrected camera orientation associated with the second input frame, wherein the corrected camera orientation associated with the second input frame is the final corrected camera orientation associated with the second input frame.

19. The non-transitory computer-readable medium of claim 18, wherein determining the initial corrected camera orientation associated with the second input frame includes determining, by the computing device and based on a logistic regression including the first gyroscope data and the second gyroscope data, a probability of camera panning.

20. The non-transitory computer-readable medium of claim 19, wherein responsive to determining that the probability of panning is zero, determining that the initial corrected camera orientation associated with the second input frame is the same as a corrected camera orientation associated with the first input frame.

* * * * *